United States Patent
Brewster et al.

[11] Patent Number: 5,851,389
[45] Date of Patent: Dec. 22, 1998

[54] APPARATUS FOR REMOVING A CONTAMINANT FROM A FLUID STREAM

[75] Inventors: Michael D. Brewster, Tonawanda; Richard P. Posa, North Tonawanda, both of N.Y.

[73] Assignee: CSK Technical, Inc., Tonawanda, N.Y.

[21] Appl. No.: 806,201

[22] Filed: Feb. 26, 1997

[51] Int. Cl.$^6$ .......................... B01D 15/00; B01D 53/04; B01D 53/18

[52] U.S. Cl. ........................... 210/264; 96/133; 210/284; 210/289

[58] Field of Search .................... 210/264, 284, 210/287, 289, 448; 93/133

[56] References Cited

U.S. PATENT DOCUMENTS

| | | | |
|---|---|---|---|
| 1,585,246 | 5/1926 | Hoy | 210/448 |
| 3,204,770 | 9/1965 | Brink | 210/287 |
| 5,193,703 | 3/1993 | Staats et al. | 210/198.2 |
| 5,256,312 | 10/1993 | Letersky | 210/497.2 |

*Primary Examiner*—Ivars Cintins
*Attorney, Agent, or Firm*—Phillips, Lytle, Hitchcock, Blaine & Huber LLP

[57] ABSTRACT

A device for removing a contaminant from a fluid stream flowing within a conduit is disclosed. The device includes a container and a barrier. The container has a first wall generated about an axis and a second wall generated about the same axis. The first wall defines a first volume therewithin, while the first and second walls define an annular second volume therebetween. Both the first and second volumes are sealed at one end of the device, while at the other end of the device the second volume only is sealed. A filter material occupies the second volume. The first and second walls are permeable to the fluid stream and are capable of retaining the filter material in the second volume. The barrier is impermeable to the fluid stream and creates a seal between the second wall and the conduit wall. The barrier is positioned adjacent the other end of the device such that when the other end of the device is the upstream end, the fluid stream must sequentially pass into the first volume, through the first wall, into the second volume and through the filter material, and through the second wall.

11 Claims, 4 Drawing Sheets

APPARATUS FOR REMOVING A CONTAMINANT FROM A FLUID STREAM

STATEMENT REGARDING FEDERALLY SPONSORED RESEARCH DEVELOPMENT

This invention was made with government support under contract W-31-109-ENG-38 awarded by the U.S. Department of Energy. The Government has certain rights in the invention.

TECHNICAL FIELD

The present invention relates generally to the field of removing contaminants from a fluid stream, and, more particularly, to an improved apparatus and method for capturing contaminants while the fluid stream is moving through a conduit to eliminate the need for add-on pipes or duct work to transport the fluid stream to a distant contaminant control device.

BACKGROUND OF THE INVENTION

Controlling the emission of volatile organic compounds (VOCs), hazardous air pollutant emissions (HAPs) and odiferous compounds to the atmosphere (cumulatively referred to hereinafter as VOCs) is a significant part of current efforts by the Environmental Protection Agency and similar governmental bodies around the world. VOCs consist of organic compounds, such as trichloroethylene benzine and carbon tetrachloride, which may be smog precursors (photochemically reactive), or which may be hazardous to human and animals or otherwise deleterious to the environment. VOCs which are regulated for their health impact on humans are classified as HAPs. HAPs also include inorganic compounds and elements which have significant vapor pressure at ambient temperatures. Examples of inorganic HAPs are mercury and its compounds, such as methyl mercury, mercuric chloride or mercurous chloride, compounds of sulfur, compounds of phosphorus, hydrogen cyanide, other cyanides and nitrites, and radon gas. Hydrogen sulfide and other reduced sulfur compounds are examples are odiferous elements compounds which, while possibly having health or environmental impacts, are controlled principally because of their odor.

VOC sources exist in industry, commerce and non-industrial and non-commercial settings. Examples of VOC sources in industry are stacks, vents, open access holes in vessels, and spills. Dry cleaners and automotive paint shops are examples of VOC sources in commercial settings. Examples of VOC sources in non-industrial and non-commercial settings are ground water, surface water, soil and debris from sites previously contaminated by VOCs now exposed to the atmosphere by new construction; sewers and storm drains having wastewaters containing VOCs; and wells, vents, or other openings into sites having VOCs or in which VOCs are stored, such as landfills.

Highly effective methods to control VOCs in large emission sources, such as significant gas streams with high concentrations of VOCs, are known. The typical control system involves transporting the gas stream through piping to either an adsorption column or a fume incinerator. These prior art systems are summarized in *Air Pollution Engineering Manual,* Buonicore, A. J. and Davis, W. T., editors (1992).

However, the application of these prior art systems to small VOC emission sources is generally impractical. First, they traditionally require large amounts of piping to transport the gas stream to the adsorption column or fume incinerator. Secondly, freezing can present a problem. A gas stream originating from the ground is generally saturated with water vapor, which can condense and freeze in the piping leading to "plugging" of the piping. Third, the condensed water carried with the gas stream reduces the absorbent's capacity to capture organic contaminants. Fourth, the setup and installation of these systems is time-consuming, resource-intensive and expensive. Finally, it is difficult to customize these systems for particular uses (e.g., easy substitution of one adsorbent for another or an absorbent).

Accordingly, an apparatus to remove contaminants from a small VOC emission source that avoids "plugging", is easily and rapidly installed and modified, that does require piping and reduces the amount of condensed water carried with the fluid stream would be an important advancement in the art.

BRIEF DESCRIPTION OF THE INVENTION

With reference to the figures and the reference numbers of the figures for illustration only and not for limitation, the current invention provides a device (10) for removing a contaminant from a fluid stream (19) flowing through a conduit (12). The device comprises a container (11) having an axis. The container has a first wall (14) generated about the axis. The first wall is permeable to the fluid stream. The container also has a second wall (15) generated about its axis. The second wall is spaced from the first wall and is also permeable to the fluid stream. The first wall defines a first volume (16), and the first and second walls define a second volume (18) therebetween. A first member (21) seals the first and second volumes at one end (20) of the container, while a second member (23) seals the second volume at the other end (22) of the container. The second volume is occupied by a filter material (24). Finally, a barrier (25), impervious to the fluid stream, is positioned and forms a seal between the second wall adjacent the end of the canister sealed by the second member and the wall of the conduit. When operatively positioned, the barrier forms a seal between the conduit wall and the container thereby preventing the fluid stream from passing the device.

In practice, the device is placed in a conduit, and the barrier is operatively positioned such that the end of the container adjacent the barrier is the downstream end of the device. The fluid stream reaches the downstream end of the device and is forced by the barrier and second member into the first volume where it passes through the first wall and into the second volume. The second volume is occupied by filter material which removes a contaminant from the fluid stream. Thereafter, the remediated fluid stream passes through the second wall and into the space upstream from the barrier between the second wall and the conduit wall to continue its upstream flow.

A single device can be utilized, or a series of devices can be used in parallel or in series. In parallel, only the most upstream device (26) has a barrier. In all but the most upstream device (39), the first member seals only the second volume at the upstream end of the device and includes a passageway providing sealed communication between the downstream end of the first volume of one device to the upstream end of the first volume of the next sequentially upstream device. Therefore, a fluid stream will pass into the first volume of the most downstream device, and then will either pass through the walls and filter material of the most downstream device or will continue through the passageways connecting the devices into the upstream devices where it will pass through the walls and filter material of those upstream devices.

In series, the fluid stream is forced through the first wall, filter material and second wall of any number of containers arranged sequentially in the conduit.

Accordingly, an object of the invention is to provide a device for removing a contaminant from a fluid stream traveling through a conduit.

Another object of the invention is to provide a device for removing a contaminant from a fluid stream without the need for transporting the fluid stream to a distant filtering location.

Another object of the invention is to provide a device for removing a contaminant from a fluid stream flowing through a conduit that can be easily modified and customized for the particular characteristics of a given situation.

Another object of the invention is to provide a device for removing a contaminant from a low emission VOC fluid stream flowing through a conduit in a cost-effective manner.

Still another object of the invention is to provide a device for removing a contaminant from a fluid stream flowing through a conduit whereby multiple devices can be connected in series or in parallel.

Still another object of the invention is to provide a device for removing a contaminant from a fluid stream flowing through a conduit which can be easily and rapidly installed and removed.

DETAILED DESCRIPTION OF THE INVENTION

Figure 1:
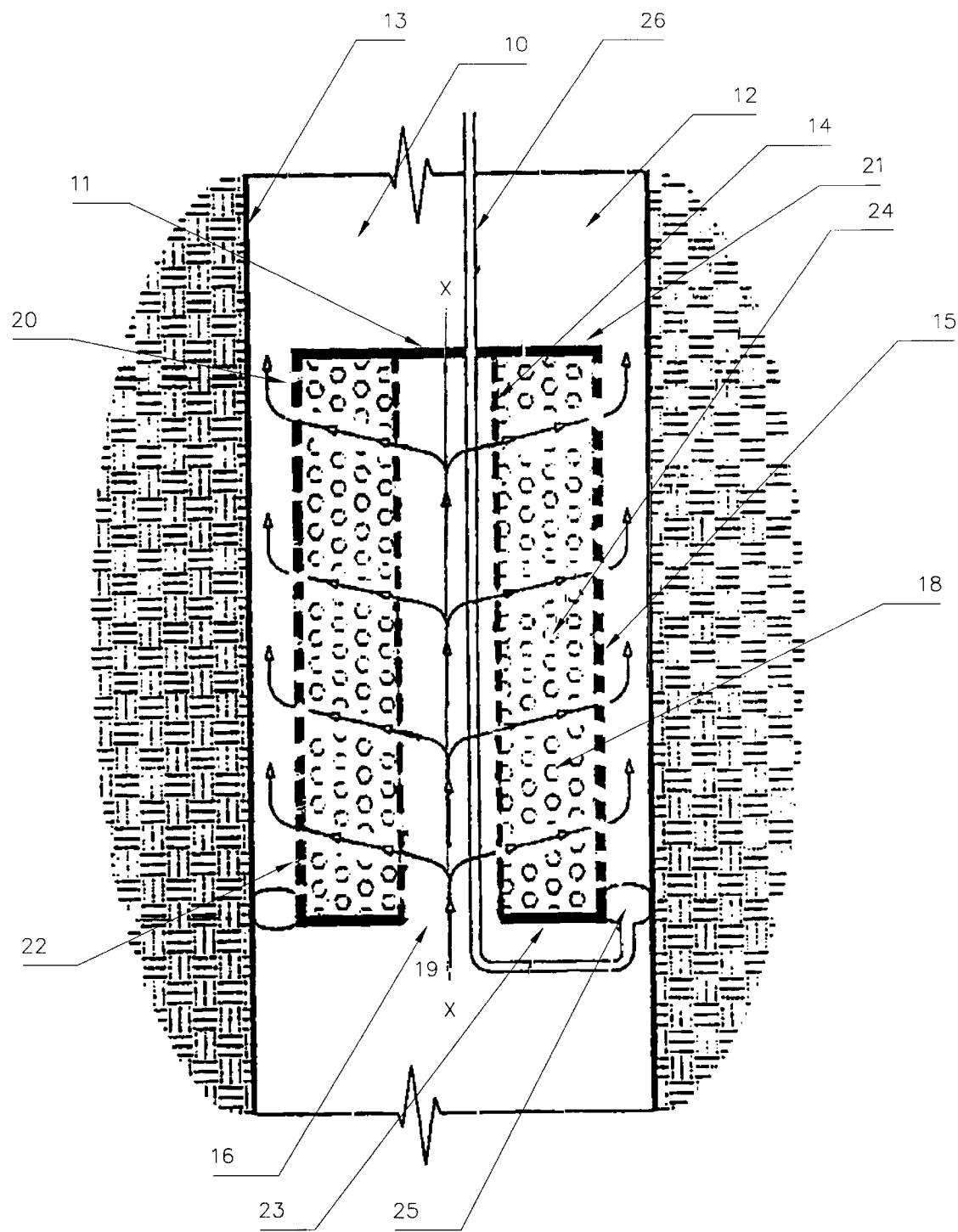
FIG. 1 is a fragmentary vertical sectional view of the device of the invention placed within a conduit.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting to FIG. 1, device 10 includes a container 11 generated about axis x—x. Container 11 is situated within conduit 12, which is defined by cylindrical conduit wall 13. Conduit 12 transfers a fluid stream to the atmosphere, from one vessel to another, to an enclosed area, or to a pipe, sewer or drain.

Container 11 includes a first wall 14 generated about axis x—x and a second wall 15 also about axis x—x. In the embodiment shown in FIG. 1, both first wall 14 and second wall 15 are cylindrical. First wall 14 defines a first volume 16 along axis x—x. First wall 14 and second wall 15 define a second volume 18 therebetween. Accordingly, a "cross-section" of container 11 taken perpendicularly to axis x—x would show first wall 14 and second wall 15 as concentric circles about axis x—x with volume 16 within first wall 14 and second volume 18 between first wall 14 and second wall 15. Both first wall 14 and second wall 15 are permeable to a fluid stream 19 flowing through conduit 12. This can be accomplished by providing a screen-type or slotted perforation similar to well screens in walls 14 and 15. The upper and lower marginal end portions of walls 14 and 15 are solid and not perforated. Walls 14 and 15 are preferably made of a stainless steel, other ferrous metals or thermoplastics.

The diameter and cross-section of container 11 are specifically chosen for the characteristics of conduit 13 into which container 11 will be placed. For example, a conduit could have a cross-section perpendicular to its axis which is oval, square, rectangular, polygonal, or irregular. Accordingly, the cross-section of a container would be chosen to correspond with that of the cross-section.

First end 20 of container 11 is sealed by first member 21, which is a plate made of stainless steel. First member 21 seals both first volume 16 and second volume 18 at first end 20. Second end 22 of container 11 is partially sealed by a second member 23, which seals only second volume 18. Accordingly, first volume 16 is open to the exterior of container 11 at second end 22. The upper and lower marginal end portions of walls 14 and 15 are solid and not perforated, thus allowing for welding or gluing of walls 14 and 15 with first and second members 21 and 22. This increases the structural strength and integrity of container 11.

Any non-permeable material which can create a seal with first wall 14 and second wall 15 and is impervious to fluid stream 19 such as mild steel, rubber, polymers, thermoplastics or ferrous metals, can be used for first member 21. In an alternative embodiment of the invention, first member 21 seals first volume 16 only.

Fluid stream 19 contains at least one contaminant which is to be filtered. This is accomplished by occupying second volume 18 with a filter material 24 capable of removing the contaminant from fluid stream 19. Filter material 24 can be of any commercially-available or specially-formulated adsorbent or absorbent material, such as activated-carbon, activated charcoal, and synthetic adsorbents. Examples of commercially-available activated carbon are Kureha BAC-MP or Westvaco Nuchar BX-7640. Synthetic adsorbents are marketed by Rohm and Haas Company, Dow Chemical Company and Purolite. The type of filter material 24 used will depend on the temperature, humidity, and chemical composition of fluid stream 19, and on the types and properties of the VOCs to be controlled. Although first wall 14 and second wall 15 are made of material permeable to fluid stream 19 at operating temperatures, pressures and flows that device 10 is likely to encounter, they are of sufficiently fine mesh to contain filter material 24 within second volume 18.

Device 10 also includes an inflatable barrier 25 surrounding second end 22 and occupying the space between second wall 15 and conduit wall 13. When inflatable barrier 25 is inflated and creates a seal between second wall 15 and conduit wall 13, the fluid stream 19 is forced into first volume 16. Accordingly, the entire fluid stream 19 is forced through device 10 and filter material 24. Inflatable barrier 25 is inflated by air, other gases or a liquid forced in to inflatable barrier 25 through tube 26, which is connected to a source of air, gas or fluid placed in an accessible location outside conduit 12 (not shown). Inflatable barrier 25 in its deflated condition facilitates the insertion and removal of device 10 from conduit 12. In alternative embodiments, inflatable barrier 25 may be replaced with any other barrier which can form a seal between second wall 15 and conduit wall 13 such as electromechanical seals, expanding diaphragm seals, static gaskets or seals made of elastomeric material such as O-rings made of DuPont VITON®, DuPont TEFLON® or ethylene propylene diene monomer (EPDM).

In an alternative embodiment, device 10 is placed in conduit 12 such that the first end 20 is downstream in relation to second end 22. Thus, fluid stream 19 flows sequentially through second wall 15, into second volume 18 and into contact with filter material 24, through wall 14 and into first volume 16.

Device 10 is particularly useful because it can be used directly in a down-hole thus avoiding many problems of the current methods of collecting and controlling VOCs at an above surface installation. Down-hole control offers a number of operational advantages such as conditions of relatively constant temperature and the elimination of containment buildings, piping and other protective structures. The relatively constant temperature below grade reduces the likelihood of "plugging" due to the freezing of water vapor in above ground piping.

To date, absorbers have not been installed directly into piping below the freeze line due to the limited amount of space available in the vents, wells, drains or other "holes" installed at contamination sites. An adequate quantity of adsorbent may be placed into the pipe, but the limited cross-sectional area perpendicular to flow of the fluid stream results in fluid flow velocities which exceed the design requirements of the adsorbent bed, and create a very high pressure drop across the bed. In addition, installation, removal, and regeneration of such adsorbent beds pose problems. However in the current invention, a number of devices 10 may be placed in parallel within conduit 13 to reduce the fluid flow velocity. Importantly, although the adsorbent bed depth, that is the distant between first wall 14 and second wall 15, remains the same, the area across which the fluid stream may flow increases, thus reducing fluid flow velocity.

Figure 2:
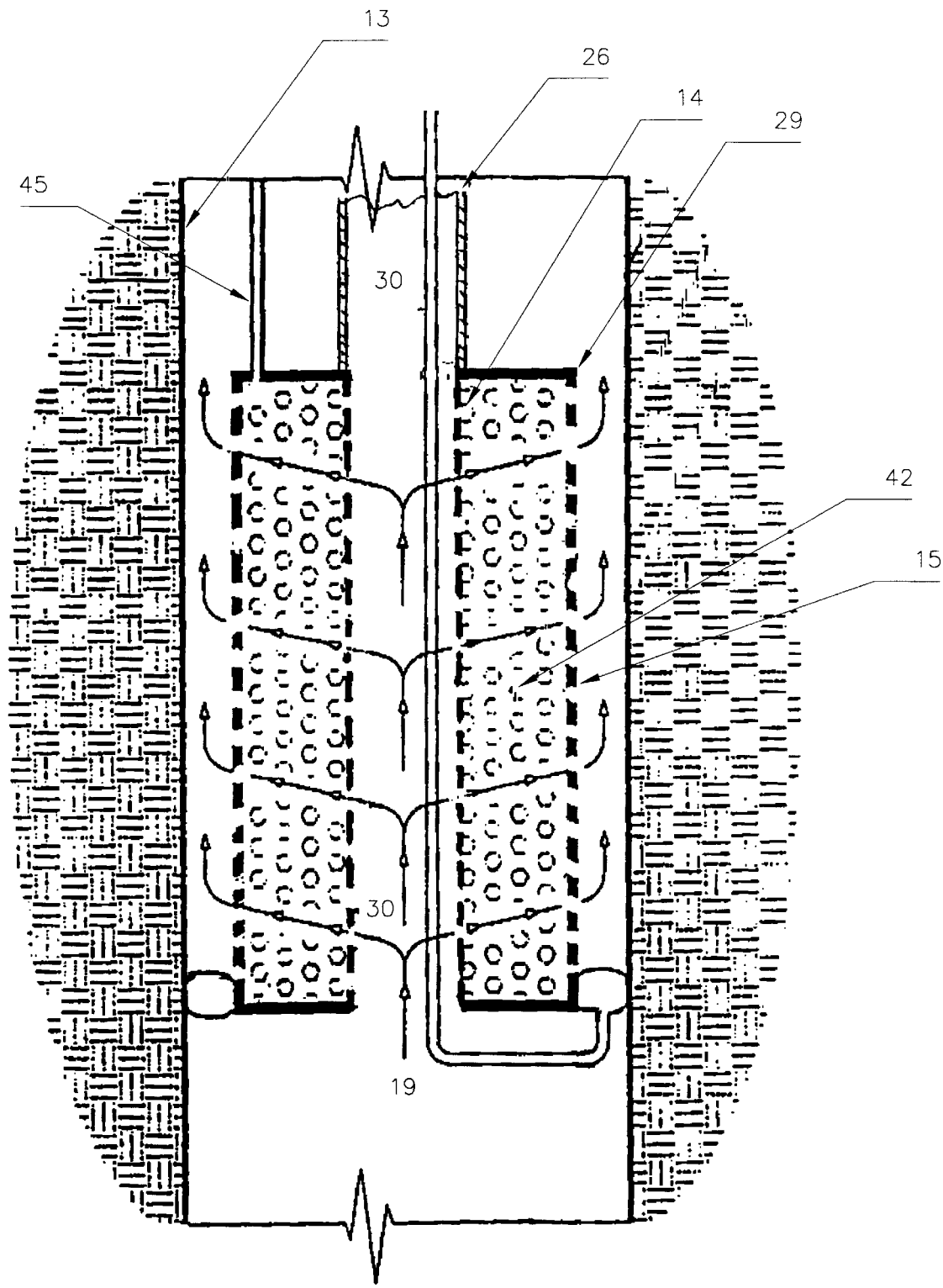
FIG. 2 is similar to FIG. 1, except showing a second embodiment of the device.
Figure 3:
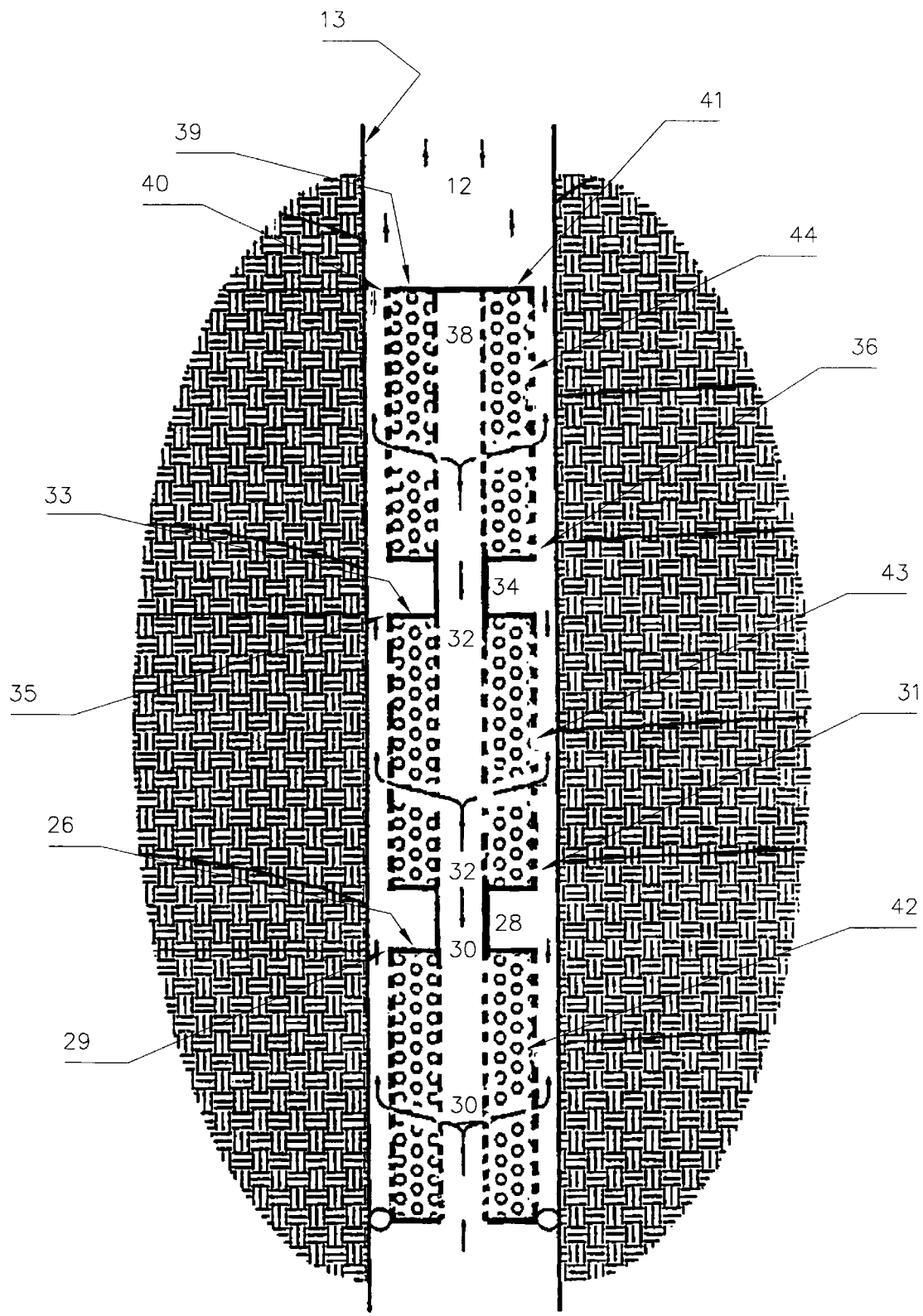
FIG. 3 is a fragmentary vertical sectional view of three devices within a conduit configured in parallel.

Adverting now to FIGS. 2 and 3, device 26 is shown to be nearly identical to device 10 except for the addition of passageway 28 which sealably connects to the upstream end 29 of first volume 30 and tube 45 (discussed later). As best shown in FIG. 3, passageway 28 connects upstream first end 29 of first volume 30 to the downstream end 31 of first volume 32 of device 33. Similarly, a passageway 34 connects the upstream end 35 of first volume 32 of device 33 to the downstream end 36 of first volume 38 of device 39. The upstream end 40 of container 39 has a first member 41 identical to member 20 of FIG. 1 in this embodiment. Devices 39, 33 and 26 are connected in parallel. That is, fluid stream 19 flows through first volume 30, passageway 28, first volume 32, passageway 34 and first volume 38. Along this extended channel, all of fluid stream 19 passes through filter material 42, 43 or 44 of devices 26, 33 and 39, respectively. This embodiment is the equivalent of placing a single, longer device within conduit 13, which is also contemplated by this invention.

Preferably, passageways 28 and 34 are made of materials likely to decrease binding when containers 26, 33 and 39 are inserted or removed from conduit 13. However, passageways 28 and 34 can be made of a rigid material for those applications where binding is not likely to be an operational problem. As is evident to one skilled in the art, any number of devices may be connected in parallel to create an installation that satisfies the performance requirements of any given application.

Figure 4:
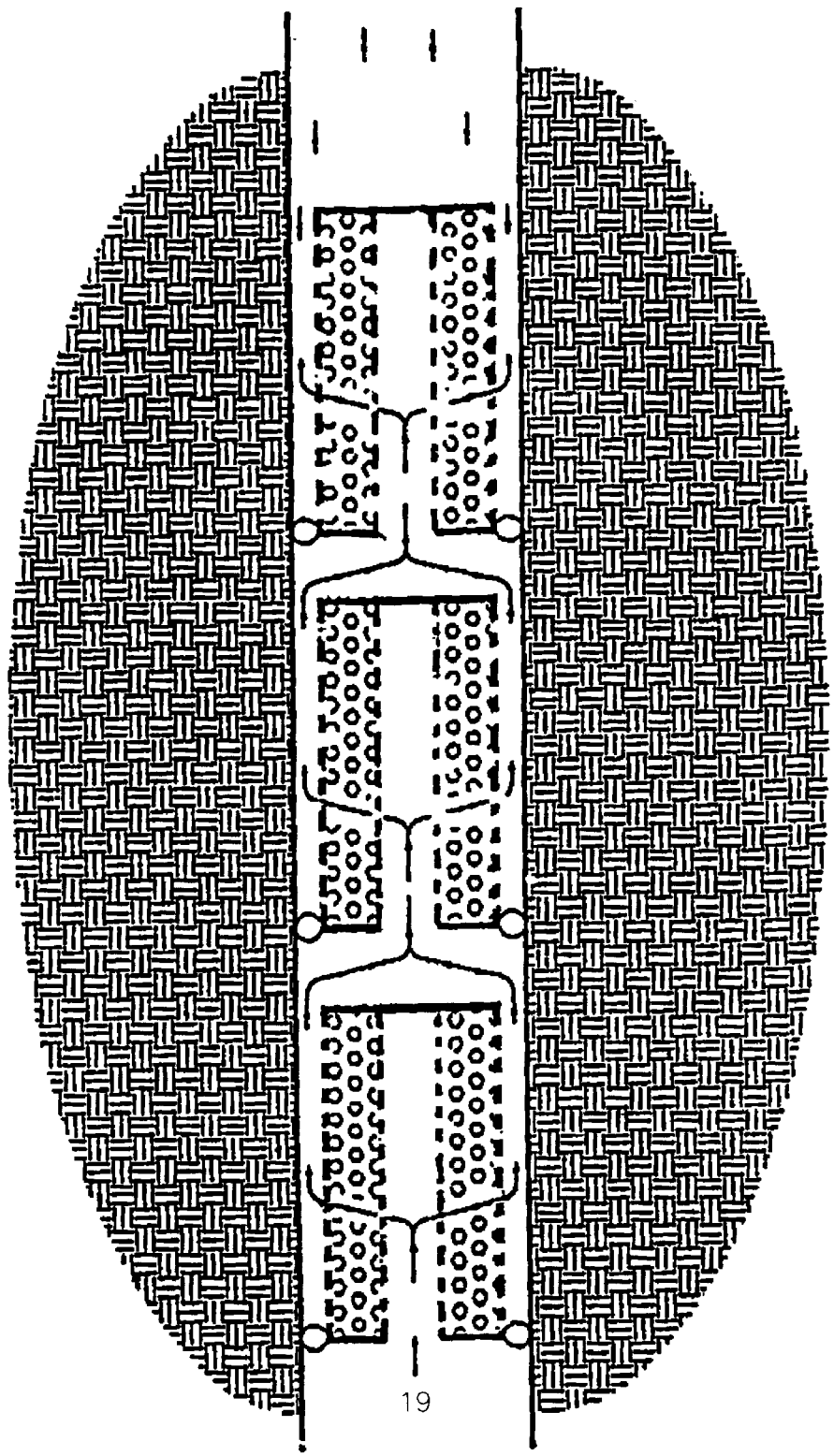
FIG. 4 is a frangmentary vertical sectional view of three devices in a conduit configured in series.

Stacking of multiple units as illustrated in FIG. 3 increases the volume of filter material and decreases the fluid flow velocity of the system. Such a configuration does not increase the depth of bed through which fluid stream 19 passes. Some applications require a greater depth of bed than can be provided by one module of the invention. Depth of bed can be increased by installing devices in series as shown in FIG. 4. When devices are installed in series, fluid stream 19 is forced sequentially through each container, thus creating an effective depth of bed greater than a single device without altering the fluid flow velocity for the system. Combinations of devices in series and in parallel permit the assembly of a system that is best suited for the specific requirements of an installation without installing specialized piping or above ground structures.

One application for the invention is to control VOCs from bore-holes at contaminated sites. Release of VOCs from bore-holes occurs because air containing VOCs released from contaminates in the ground is forced up through the bore-holes by either changes in the level of the water table and/or barometric pumping. Changes in the water table cause two effects. As the water table rises, it carries contaminates up from the saturated zone of the soil and deposits them within the soil in the vadose zone. When the water level then drops, the VOCs evaporate and saturate the air in the surrounding formation. When the water table rises again, the now-contaminated air is displaced and forced up through the path of least resistance, such as bore-holes, vents and wellheads. These VOC emissions are analogous to "filling losses" in tanks. Changes in the level of the water table normally occur coincident with and in the days after storm events. They are especially severe in mountainous regions where the water enters the ground through normal pathways at higher elevations and flows into the water table at lower elevations. This flow can result in acre-feet of accumulation to water, and hence the displacement of an equivalent volume of contaminated air from the ground.

Barometric pumping occurs when natural changes in temperature and barometric pressure cause VOC-saturated air in the vadose and unsaturated zones to flow in and out of bore-holes and wellheads. VOC emissions caused by barometric pumping are analogous to "breathing losses" encountered in storage tanks. The combined result of these mechanisms is a source of VOC emissions that must be controlled to meet environmental standards. The placement of a device, or a number of devices depending on the requirements, in bore-holes and wellheads of contaminated sites will control VOC emissions from water table changes and barometric pumping.

It is also possible to use the device of the invention in conjunction with an in-situ biological process. In such an embodiment, the site is seeded with nutrients which stimulate the indigenous microbes to consume VOCs. During this bio-remediation, VOCs are released, and these can be captured by use of the device of the invention. Regeneration of adsorbents used as filter material 24 can be augmented by periodically blowing steam through the devices to regenerate the adsorbent. The quantity of steam required will not significantly rise the temperatures of site. The steam, along with the desorbed VOCs, will condense in the site and the VOCs drawn back into the biologically-active region will be degraded by the microbes thereby improving the efficiency of the biodegradation and reducing VOC emissions occurring during the course of cleanup.

Certain filter materials can be augmented during use. Adverting to FIG. 2, filter material 42 may be a cloth saturated with a reactive liquid such as hypochlorite solution. The hypochlorite solution is continually added to filter media 42 by means of tube 45 leading to an external reservoir (not shown). Hypochlorite solutions are useful in controlling orders from reduced sulfur compounds.

A further application for the invention is in conjunction with drains and sewers. In some areas, industrial and commercial releases to drains and sewers include VOCs. These VOC releases are of sufficient magnitude or type that they require control. If so, a check valve in a drain will allow liquid fluids to pass downward but will block gas flow upward. The upward flowing gases are then forced into a conduit similar to conduit 13 in FIG. 1 and then through one or more devices 10 which remove VOCs and control odor.

A prototype of the invention was tested for effectiveness on trichloroethylene. The influent concentration of trichloroethylene ranged between approximately 30 and 450 parts per million (molar or volume basis). The filter material used was activated carbon in one device and a synthetic adsorbent in a second device. The bed depth was one and one-half inches. Flow velocity was approximately 8 ft/min. Effluent concentrations were consistently below the detection limit of 0.1 ppm. The tests showed a consistent low pressure drop across the filter material bed, indicating applicability to the abatement of a wide range of contamination situations.

Modifications

In-parallel and in-series embodiments of the invention have been described. It is also possible to combine in the same conduit both in-parallel and in-series devices. In addition, it is possible to use different types of filter material in the containers of in-parallel and in-series embodiments to remove a plurality of contaminates from a fluid stream.

Furthermore, an air pump may be added to create negative pressure within a conduit having a device 10 to increase the rate of fluid stream 19.

While preferred embodiments of the invention have been described, it should be understood that the various changes, adaptation and modifications may be made without departing from the spirit of the invention on the scope of the appended claims.

I claim:

1. A device arranged to be longitudinally inserted and removed from a conduit, and arranged to be positioned at a desired location along said conduit to remove a contaminant from a fluid flowing through said conduit, comprising:

a container having an axis, said container having:

a first wall generated about said axis, said first wall being permeable to said fluid stream;

a second wall generated about said axis, said second wall being spaced from said first wall and being permeable to said fluid stream;

said first wall defining a first volume;

said first and second walls defining a second volume therebetween;

a first member sealing said first and second volumes at one end of said container;

a second member sealing said second volume at the other end of said container;

said second volume occupied by filter material;

a expandable barrier impervious to said fluid stream positioned adjacent said other end and selectively forming a seal between said second wall and the wall of said conduit;

such that said device may be longitudinally inserted into said conduit and moved to a desired position therealong, and said barrier may be selectively expanded to seal the space between said second wall and said conduit wall, so that said fluid stream flowing through said conduit will be sequentially directed into said first volume, through said first wall, into said second volume where said filter material removes said contaminant from said fluid, and through said second wall.

2. The device as described in claim 1 wherein said first and second walls are cylindrical.

3. The device as described in claim 1 wherein an additional device is positioned in said conduit downstream from said device whereby said fluid stream flows sequentially through said device then said additional device.

4. The device as described in claim 1 wherein an additional device is positioned in said conduit downstream from said device;

said additional device lacking a barrier;

said first member of said device seals said second volume and said first member includes a passageway providing sealed communication between said upstream end of said first volume of said device and the downstream end of said first volume of said additional device;

whereby said fluid stream flows only through one of said device or additional device.

5. The device as described in claim 1 wherein said filter material is an adsorbent.

6. The device as described in claim 1 wherein said filter material is an absorbent.

7. The device as described in claim 1 wherein said filter material is continuously wetted by reactive liquid.

8. The device as described in claim 1 wherein said barrier is selectively inflatable.

9. The device as described in claim 1 wherein said barrier is made of an elastomeric material.

10. The device as described in claim 1 wherein said barrier is an electromechanical seal.

11. The device as described in claim 1 wherein said barrier is a static gasket.

* * * * *